United States Patent
Micic et al.

(10) Patent No.: US 11,446,877 B2
(45) Date of Patent: Sep. 20, 2022

(54) 3D PRINTING WATER SOLUBLE SUPPORT FILAMENT AND METHOD OF MANUFACTURE THEREOF

(71) Applicant: WOLF & ASSOCIATES, INC., Fountain Valley, CA (US)

(72) Inventors: Miodrag Micic, Fountain Valley, CA (US); Erick Packard Wolf, Corona del Mar, CA (US)

(73) Assignee: WOLF & ASSOCIATES, INC., Las Vegas, NV (US)

( * ) Notice: Subject to any disclaimer, the term of this patent is extended or adjusted under 35 U.S.C. 154(b) by 349 days.

(21) Appl. No.: 16/228,602

(22) Filed: Dec. 20, 2018

(65) Prior Publication Data

US 2019/0202134 A1 Jul. 4, 2019

Related U.S. Application Data

(60) Provisional application No. 62/611,263, filed on Dec. 28, 2017.

(51) Int. Cl.

| | | |
|---|---|---|
| *B29C 64/40* | (2017.01) | |
| *C08L 29/04* | (2006.01) | |
| *C08L 55/02* | (2006.01) | |
| *C08L 23/12* | (2006.01) | |
| *C08L 23/06* | (2006.01) | |
| *C08L 77/06* | (2006.01) | |
| *C08L 29/14* | (2006.01) | |
| *C08L 79/04* | (2006.01) | |
| *B33Y 70/00* | (2020.01) | |
| *C08L 77/00* | (2006.01) | |
| *C08L 101/14* | (2006.01) | |
| *B33Y 10/00* | (2015.01) | |
| *C08L 25/06* | (2006.01) | |
| *B29K 105/00* | (2006.01) | |
| *B29K 77/00* | (2006.01) | |
| *B29K 29/00* | (2006.01) | |

(52) U.S. Cl.
CPC .............. *B29C 64/40* (2017.08); *B33Y 70/00* (2014.12); *C08L 23/06* (2013.01); *C08L 23/12* (2013.01); *C08L 29/04* (2013.01); *C08L 29/14* (2013.01); *C08L 55/02* (2013.01); *C08L 77/00* (2013.01); *C08L 77/06* (2013.01); *C08L 79/04* (2013.01); *C08L 101/14* (2013.01); *B29K 2029/04* (2013.01); *B29K 2077/00* (2013.01); *B29K 2105/0088* (2013.01); *B33Y 10/00* (2014.12); *C08L 25/06* (2013.01); *C08L 2205/03* (2013.01); *C08L 2207/04* (2013.01)

(58) Field of Classification Search
CPC ........ B29C 64/40; C08L 101/14; C08L 29/04; C08L 55/02; C08L 23/12; C08L 23/06; C08L 77/06; C08L 29/14; C08L 79/04; C08L 77/00; C08L 25/06; C08L 2205/03; C08L 79/02; C08L 2207/04; B33Y 70/00; B33Y 10/00; B29K 2105/0088; B29K 2077/00; B29K 2029/04
See application file for complete search history.

(56) References Cited

U.S. PATENT DOCUMENTS

| | | | | |
|---|---|---|---|---|
| 6,070,107 | A * | 5/2000 | Lombardi | B33Y 10/00 700/119 |
| 6,103,809 | A * | 8/2000 | Ahmed | A61L 15/26 524/487 |
| 2015/0360055 | A1* | 12/2015 | Vilsmeier | A61N 5/1071 600/1 |
| 2018/0111337 | A1* | 4/2018 | Demuth | B29C 64/118 |
| 2019/0002172 | A1* | 1/2019 | Hodgdon | C11D 17/043 |
| 2019/0224915 | A1* | 7/2019 | Hayashi | C08L 25/14 |

* cited by examiner

*Primary Examiner* — Jeffrey M Wollschlager
(74) *Attorney, Agent, or Firm* — Knobbe Martens Olson & Bear LLP

(57) ABSTRACT

Disclosed herein are at least partially water soluble compositions for use in 3D printing. The compositions comprise a mixture of polymeric materials that can be printed using existing 3D printing devices to form a support scaffold for overhanging parts of a 3D object to be printed. The 3D object can be printed such that at least a portion of the 3D object is printed onto the support scaffold. After printing, the support scaffold can be removed from the 3D object by treatment with water, such as by immersion in water. The compositions can comprise a mixture of one or more water soluble polymers and one or more water insoluble polymers.

12 Claims, No Drawings

3D PRINTING WATER SOLUBLE SUPPORT FILAMENT AND METHOD OF MANUFACTURE THEREOF

CROSS-REFERENCE TO RELATED APPLICATIONS

This application claims the benefit of U.S. Provisional Application Ser. No. 62/611,263, filed Dec. 28, 2017, entitled 3D PRINTING WATER SOLUBLE SUPPORT FILAMENT AND METHOD OF MANUFACTURE THEREOF, which is hereby incorporated by reference in its entirety.

FIELD

The present application relates to the field of printing of three dimensional (3D) objects. More particularly, disclosed herein are compositions, materials, and methods for removably supporting printed objects during 3D printing. Also disclosed herein are methods of making such compositions.

BACKGROUND

Three-dimensional (3D) printing is a process used for the printing of three-dimensional objects, for example, by printing or building parts of such objects in layers. Such 3D objects may be used, for example, for prototype parts, for customized build articles, or for decorative articles. An additive manufacturing system (e.g., a fused deposition modeling (FDM) or extrusion-based additive manufacturing system) is used to build 3D objects, parts, or models from a digital representation of the 3D object using one or more additive manufacturing techniques such as layer-by-layer extrusion of a flowable part material. Generally, movement of the extrusion head with respect to the substrate is performed under computer control, in accordance with build data that represents the 3D object. The build data is obtained by initially slicing the digital representation of the 3D object into multiple horizontally sliced layers. Then, for each sliced layer, the host computer generates a build path for depositing roads of modeling material to form the 3D object. As the sequential cross-sectional layers of the 3D object are deposited on a platform they undergo curing, fusing to generate the 3d object. Generally, the printed 3D object is then separated from the platform, or print bed.

SUMMARY

Provided herein are compositions, devices and methods for providing a soluble support scaffold material for 3D printing.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be used, and other changes may be made, without departing from the spirit or scope of the subject matter presented here. The embodiments of the present disclosure, as generally described herein, can be arranged, substituted, combined, and designed in a wide variety of different configurations, all of which are explicitly contemplated and made part of this disclosure.

During 3D printing, overhanging parts may be printed onto a support scaffold which can be removed after printing. A support scaffold material may be printed from a printable support scaffold filament material. After a 3D object is printed including a soluble support scaffold, the support scaffold material may be removed by immersing or otherwise treating the 3D object with a solution in which the support scaffold material is soluble. Existing soluble support scaffold materials generally require one or more of caustic solutions, detergents, organic solvents, elevated water temperature, or the like.

Generally described, embodiments disclosed herein are compositions and methods for providing a soluble and/or dissolvable support scaffold which is soluble in water without requiring the addition of detergents or caustic agents. The composition may allow the support scaffold material to be dissolved in water at room temperature. In various embodiments, the compositions may include a blend of one or more water-soluble polymers and one or more water-insoluble polymers.

Hereinafter, specific embodiments of the present disclosure will now be described in more detail. The embodiments may, however, be represented in many different forms and should not be construed as being limited to the specific embodiments set forth herein. Rather, these specific embodiments are provided so that this disclosure will be thorough and complete, and will fully convey the scope of the embodiments to those skilled in the art.

Described herein are at least partially soluble and/or dissolvable 3D printing filaments for use in the fused deposition modelling 3D printing process. The filaments can be soluble in water without addition of detergents, caustic agents, organic solvents, or the like. Furthermore, such filament can have tailored surface and adhesion properties, for example, such that it bonds well with various thermoplastics, polymers, glass, or other 3D printable materials.

During various additive 3D printing processes, a support scaffold may used to provide structural support for overhanging parts. In some implementations, the support scaffold is printed before or simultaneously with a 3D object to be printed. Typically, printing the 3D object onto the scaffold causes the scaffold to be adhered to the 3D object. Thus, support scaffold materials may be selected to be at least partially soluble in a solvent such that the scaffold can be removed by dissolution. Existing soluble support scaffold materials, such as Stratasys Soluble support, requires use of either caustic solutions, detergents, organic solvents (e.g., when using high impact polystyrene (HIPS)), or a combination of thereof in order to dissolve the support structure. Frequently, an elevated water temperature may be required as well. Accordingly, support scaffold materials may simplify the manufacturing process if they can be removed after manufacturing without requiring heated process water or hazardous solvents.

The compositions described herein provide soluble support material for 3D printed parts. In some embodiments, the materials can be dissolved at room temperature and without the use of the additives such as caustic reagents and detergents. Furthermore, embodiments described herein can include materials which are generally regarded as safe chemicals, thus allowing for easy disposal of the removed waste support material into mainstream disposals, in accordance with local regulations.

In some embodiments, the materials may include Poly(2-ethyl-2-oxazoline), sold under the tradename Aquazol. Grades of Aquazol include at least 5, 50, 200, and 500. In some embodiments, the materials may include Acetoacetyl Modified PVOH, sold under the tradename G-Polymer. Grades of G-Polymer include at least 8150P, 8181P, and 8120P.

In some embodiments, the dissolvable and/or soluble material which consists of a blend of two aqueous soluble (water soluble) polymers and one aqueous insoluble (water insoluble or hydrophobic) polymer. Both the water soluble and water insoluble polymers may be thermoplastics in nature. In some embodiments, at least one of the water soluble polymers has detergent/surfactant or pluronic-like properties, and other water soluble polymer provides structural properties. The water insoluble hydrophobic polymer can provide improved adhesion and/or bridging between the dissolvable support and a structural thermoplastic material which is being 3D printed to form a printed object.

In some embodiments, the dissolvable material comprises or consists essentially of a polymer blend of water soluble thermoplastic polymers. For example, the water soluble thermoplastic polymers may belong to the group of polyamides and its derivatives, and/or polyvinyl alcohol or its derivatives. The soluble material can further include small quantities (e.g., <25%, <10%, <5%, etc.) of any of various thermoplastic water insoluble polymers used for 3D printing. Non-limiting examples of such thermoplastic water insoluble polymers can include acrylonitrile butadiene styrene (ABS), polystyrene (PS), polypropylene (PP), polyethylene (PE), or nylon.

In some embodiments, the dissolvable material includes a mixture of at least two water soluble polymers and one water insoluble polymer, wherein at least one of the water soluble polymers belongs to the group of polyelectrolytes. In some embodiments, such materials may additionally contain pluronics or detergents embedded in a blend. In addition, such materials may contain additives such as fillers, colorants and fragrances. For example, the dissolvable structural support composition may consist essentially of two water soluble polymers and a water insoluble polymer, while also containing a small quantity of filler, colorant, and/or fragrance.

In some embodiments, the dissolvable support scaffold materials described herein may be extruded in a form of the rod or filament. For example, the materials can be provided in the form of a 3D printable filament such that the support scaffold can be 3D printed similar to the object to be printed on the support scaffold. In some implementations, a dissolvable support scaffold filament and a structural thermoplastic filament may be used with a dual extrusion 3D printer such that the support scaffold and a 3D object can be manufactured substantially simultaneously.

In some embodiments, the dissolvable support scaffold material is tailored to have glass transition and melting temperatures to match the melting property of complimentary non-soluble thermoplastics, for example, thermoplastics used to 3D print parts.

In some embodiments, the dissolvable support scaffold material comprises a blend made of the mixture of polyoxazoline and polyvinyl butyral with non-soluble thermoplastics. In some embodiments, the dissolvable support scaffold material comprises a polymer blend made of a mixture of Poly(2-ethyl-2-oxazoline)and Acetoacetyl Modified PVOH and non water-soluble thermoplastics such as acrylonitrile butadiene styrene (ABS), polystyrene (PS), polypropylene (PP), polyethylene (PE), or nylon. In some embodiments, the dissolvable support scaffold material comprises a blend made of the mixture of Poly(2-ethyl-2-oxazoline) and Acetoacetyl Modified PVOH with stoichiometric ratios ranging between 1:10, 1:5, 1:1, 5:1, 10:1, etc., and with non-soluble thermoplastics in quantities of less than 10% w/w. In some embodiments, the dissolvable support scaffold material comprises an extruded blend of a mixture of Poly(2-ethyl-2-oxazoline), Acetoacetyl Modified PVOH in a weight/weight ratio of between 20:1 and 5:1 with Polypropylene from 0.5 to 0.001 w/w.

In some embodiments, the dissolvable support scaffold material can be manufactured by direct extrusions of polymer pellets or powder mixtures of the constituent polymeric materials loaded into an extruder. For example, mixtures of polymer pellets and/or powders can be pre-compounded, followed by extrusion of the compounded pellets or powder. In one example manufacturing method, a 3D printable dissolvable support scaffold material can be manufactured by mechanically mixing pellets of Poly(2-ethyl-2-oxazoline), Acetoacetyl Modified PVOH, and Polypropylene to produce a pellet mixture, drying the pellet mixture, loading the pellet mixture into a multi-zone extruder, extruding the pellet mixture into a filament at a temperature of between 150° C. and 250° C. (e.g., between 165° C. and 210° C., or other suitable range), and rolling the extruded filament onto one or more filament rolls. In some embodiments, the filament can have a diameter between 0.5 mm and 5 mm, between 1 mm and 4 mm, between 1.5 mm and 3.1 mm, or other diameter suitable for printing with a desired 3D printing process and/or apparatus.

As described above, the dissolvable support scaffold materials may be softened and soluble in clear water without the addition of any external detergents, soaps, caustic reagents, acidic reagents or other additives. For example, the materials may be soluble and/or dissolvable in pure water (e.g., distilled water) and/or a solution consisting essentially of water, such as tap water or other water containing small quantities of minerals or other impurities. As used herein, soluble or dissolvable materials may not necessarily be completely dissolved into solution when immersed in water for removal from a 3D printed object. For example, immersing a 3D printed object and adhered support scaffold into a vessel of water may cause the support scaffold material to break down and/or at least partially dissolve in the water. However, at least a portion of the dissolvable support scaffold material (e.g., the water insoluble polymer component of certain embodiments of the support scaffold material) may settle away from the 3D printed object without being dissolved in solution with the water.

In some embodiments, a 3D printing method is described. The method comprises printing, with a dissolvable support scaffold material, a support scaffold shaped to support at least a portion of a 3D object to be printed, and printing, with a water insoluble 3D printing medium, the 3D object such that at least a portion of the 3D object is printed onto the support scaffold. The dissolvable support scaffold material can comprise any of the materials described herein, for example, a blend of at least one water soluble thermoplastic polymer belonging to the group polyamides and its derivatives, at least one thermoplastic polymer belonging to the group of polyvinyl alcohol or its derivatives, and at least one 3D printable water insoluble thermoplastic polymer. In some embodiments, the method further comprises immersing the 3D object and the support scaffold in water or a solution consisting essentially of water, such that substantially all of the dissolvable support scaffold material is removed from the 3D object. At least a portion of the 3D object can be printed simultaneously with the printing of at least a portion of the support scaffold, for example, where a dual extruding 3D printer is utilized.

In some embodiments, the support scaffold materials described herein may alternatively or additionally be utilized as an adhesion layer for anchoring a 3D printed object to a print bed. One such manufacturing method comprises applying an adhesion layer to a printing bed, and printing a 3D object on to the adhesion layer such that the 3D object is adhered to the adhesion layer. The adhesion layer can comprise any of the materials described herein, for example, a blend of at least one water soluble thermoplastic polymer belonging to the group polyamides and its derivatives, at least one thermoplastic polymer belonging to the group of polyvinyl alcohol or its derivatives, and at least one 3D printable water insoluble thermoplastic polymer. The method can further comprise immersing the 3D object and adhesion layer in water or a solution consisting essentially of water, such that substantially all of the adhesion layer is removed from the 3D object.

A printed material will generally be deposited on a print bed, or print platform. The surface upon which printing takes place is generally made of a hydrophilic material, which may comprise glass, ceramic material, stainless steel, fiberglass-epoxy, wood, paper, phenolics (for example, Garolite), nylon 6/6, and combinations thereof.

An adhesion layer of the materials described herein can be applied by any suitable method. Persons of skill in the art will understand that a suitable method of application will vary depending on a number of factors, including adhesive composition, polymer to be printed, print platform material, and restrictions imposed by a printing process. The temperature at which an adhesive composition is applied can also affect a suitable application method. In some embodiments, an adhesive composition at room temperature is applied to a print platform. In various embodiments, suitable application methods include 3D printing, spraying, smearing, wiping, spreading, brushing, dipping, or a combination of these.

In some embodiments the composition is selected for printing at a selected print-bed temperature. In some embodiments the composition is applied on the print platform at a print-bed temperature of about 25° C. to about 175° C., about 25° C. to about 100° C., about 100° C. to about 150° C., about 90° C. to about 130° C., or about 120° C. to about 150° C.

The foregoing description has shown, described and pointed out fundamental novel features of adhesive compositions provided herein. The various compositions, methods, procedures, and techniques described above provide a number of ways to carry out the described embodiments and arrangements. Of course, not necessarily all features, objectives or advantages described are required and/or achieved in accordance with any particular embodiment described herein. Also, although the invention has been disclosed in the context of certain embodiments, arrangements and examples, it will be understood by those skilled in the art that the invention extends beyond the specifically disclosed embodiments to other alternative embodiments, combinations, sub-combinations and/or uses, modifications and equivalents thereof. Accordingly, the invention is not intended to be limited by the specific disclosures of the embodiments herein. Moreover, although features may be described above as acting in certain combinations, one or more features from a claimed combination can, in some cases, be excised from the combination, and the combination may be claimed as any subcombination or variation of any subcombination.

What is claimed is:

1. A dissolvable support material consisting of a blend of two water soluble polymers and acrylonitrile butadiene styrene (ABS), wherein:
   the water soluble polymers are thermoplastics;
   a first polymer of the water soluble polymers is a polyvinyl alcohol;
   a second polymer of the water soluble polymers is Poly (2-ethyl-2-oxazoline); and
   wherein the ABS comprises about 10% w/w of the dissolvable support material.

2. The dissolvable support material of claim 1, wherein the dissolvable support material is extruded in a form of a rod or filament.

3. The dissolvable support material of claim 1, wherein the dissolvable support material has glass transition and melting temperatures matching glass transition and melting temperatures of one or more 3D printable non-soluble thermoplastics.

4. The dissolvable support material of claim 1, wherein the dissolvable support material is capable of binding simultaneously to both hydrophobic polymers and to glass bed surfaces.

5. The dissolvable support material of claim 1, wherein the dissolvable support material is manufactured by direct extrusion of polymer pellets or powder mixtures loaded into an extruder.

6. The dissolvable support material of claim 1, wherein the dissolvable support material is manufactured by pre-compounding mixtures of polymers into pellets or powder, followed by extrusion of the compounded pellets or powder.

7. The dissolvable support material of claim 1, wherein the dissolvable support material softens and is soluble in water without the addition of any external detergents, soaps, caustic reagents, acidic reagents or other additives.

8. A dissolvable support material consisting of:
   at least one water soluble thermoplastic polymer belonging to the group polyamides;
   at least one thermoplastic polymer belonging to the group of polyvinyl alcohol; and
   at least one 3D printable water insoluble thermoplastic polymer comprising acrylonitrile butadiene styrene (ABS), wherein the ABS comprises about 10% w/w of the dissolvable support material.

9. The dissolvable support material of claim 8, wherein the dissolvable support material comprises a mixture of polyoxazoline and polyvinyl butyral.

10. The dissolvable support material of claim 8, wherein the dissolvable support material comprises a mixture of Poly(2-ethyl-2-oxazoline), Acetoacetyl Modified PVOH, and the ABS.

11. The dissolvable support material of claim 8, consisting of a mixture of Poly(2-ethyl-2-oxazoline) and Acetoacetyl Modified PVOH with stoichiometric ratios ranging from 1:1 to 1:10 to 10:1 and the ABS.

12. The dissolvable support material of claim 8, consisting of an extruded mixture of Poly(2-ethyl-2-oxazoline), Acetoacetyl Modified PVOH in a weight/weight ratio of between 20:1 and 5:1, with Polypropylene from 0.5 to 0.001 w/w and the ABS.

* * * * *